(12) United States Patent
DuBois et al.

(10) Patent No.: US 7,872,065 B2
(45) Date of Patent: *Jan. 18, 2011

(54) ADHESIVE COMPOSITIONS COMPRISING MIXTURES OF BLOCK COPOLYMERS

(75) Inventors: Donn A. DuBois, Houston, TX (US); George Gumulka, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 246 days.

This patent is subject to a terminal disclaimer.

(21) Appl. No.: 11/372,157

(22) Filed: Mar. 9, 2006

(65) Prior Publication Data

US 2007/0244252 A1 Oct. 18, 2007

Related U.S. Application Data

(60) Provisional application No. 60/661,093, filed on Mar. 11, 2005.

(51) Int. Cl.
C08L 9/00 (2006.01)
C08L 53/02 (2006.01)

(52) U.S. Cl. .......................... 524/474; 524/505; 525/89

(58) Field of Classification Search .................. 525/89; 524/474, 505
See application file for complete search history.

(56) References Cited

U.S. PATENT DOCUMENTS

| 6,531,263 | B2 | 3/2003 | Knoll |
| 6,833,411 | B2 | 12/2004 | Fujiwara et al. |
| 2003/0232928 | A1 | 12/2003 | Atwood et al. |
| 2004/0116582 | A1 | 6/2004 | De Keyzer et al. |
| 2005/0137312 | A1 | 6/2005 | DuBois |
| 2006/0099373 | A1* | 5/2006 | Dupont et al. ............. 428/41.8 |
| 2006/0155062 | A1* | 7/2006 | De Keyzer ................... 525/88 |
| 2006/0205877 | A1* | 9/2006 | DuBois ....................... 525/88 |
| 2006/0205878 | A1* | 9/2006 | DuBois ....................... 525/88 |

FOREIGN PATENT DOCUMENTS

| DE | 29 42 128 | | 4/1981 |
| EP | 0 532 831 | A1 | 3/1993 |
| EP | 0 802 251 | A1 | 10/1997 |
| EP | 1 426 411 | A1 | 6/2004 |
| EP | 1 493 790 | A1 | 1/2005 |
| EP | 1 553 149 | A1 | 7/2005 |
| EP | 1 566 423 | A1 | 8/2005 |
| JP | 2004-131707 | | 4/2004 |
| WO | 91/02039 | | 2/1991 |
| WO | 00/14170 | | 3/2000 |
| WO | 00/14170 | A1 | 3/2000 |
| WO | 02/057386 | | 7/2002 |
| WO | 2004/074394 | A1 | 9/2004 |
| WO | 2004/097523 | | 11/2004 |

OTHER PUBLICATIONS

K. Lee, et al. *Synthesis and Tensile Properties of Styrene-Butadiene-Isoprene Ternary Block Copolymer*; International Union of Pure Applied Chemistry; Jun. 30-Jul. 4, 2003 p. O48.

* cited by examiner

*Primary Examiner*—Jeffrey C Mullis
(74) *Attorney, Agent, or Firm*—Michael A. Masse; Clements Bernard

(57) ABSTRACT

Less expensive adhesive compositions having good adhesive properties can be achieved by combining an S-I-S or $(SI)_nX$ block copolymers with an S-(I/B) diblock copolymer and a single tackifying resin. Furthermore, less expensive adhesive compositions can be achieved by combining S-I diblock copolymers with S-(I/B)-S or $[S(I/B)]nX$ block copolymers and a single tackifying resin. These combinations result in lower costs of starting materials and manufacturing due to simpler processing.

9 Claims, No Drawings

US 7,872,065 B2

ADHESIVE COMPOSITIONS COMPRISING MIXTURES OF BLOCK COPOLYMERS

This application claims the benefit of priority of U.S. Provisional Application No. 60/661,093 filed on Mar. 11, 2005 and entitled "ADHESIVE COMPOSITIONS COMPRISING MIXTURES OF BLOCK COPOLYMERS."

FIELD OF THE INVENTION

The present invention relates to adhesive compositions comprising mixtures of block copolymers. More particularly, the present invention relates to adhesive compositions comprising at least one block copolymer having at least two poly(vinyl aromatic) blocks and at least one poly(conjugated diene) block, at least one block copolymer having one poly(vinyl aromatic) block and at least one poly(conjugated diene) block, one tackifying resin that is readily available and relatively inexpensive, and optionally one or more plasticizers. Even more specifically, the present invention relates to an adhesive composition comprising at least one block copolymer having two or more poly(vinyl aromatic) blocks and one or more poly(isoprene) blocks, at least one block copolymer having one block copolymer having one poly(vinyl aromatic) block and one poly(isoprene/butadiene) block, a tackifying resin selected from C5 hydrocarbon resins and optionally, one or more plasticizers. The present invention further relates to an adhesive composition comprising at least one block copolymer having two or more poly(vinyl aromatic) blocks and one or more poly(isoprene/butadiene) blocks, at least one block copolymer having one poly (vinyl aromatic) block and one poly(isoprene) or one poly(butadiene) block, a tackifying resin selected from C5 hydrocarbon resins and optionally, one or more plasticizers.

BACKGROUND OF THE INVENTION

Adhesive compositions based on styrenic block copolymers as thermoplastic elastomer components are well known in the art. These compositions are, for instance, used as pressure sensitive adhesives (PSA) for industrial tapes, packaging tapes and labels, and in multipurpose hot-melt adhesive compositions which may be used to bond or construct articles in the manufacture of disposable soft goods, such as diapers, feminine care articles, surgical drapes and the like.

Poly(styrene)-poly(isoprene)-poly(styrene) block copolymers (S-I-S) and poly(styrene)-poly(butadiene)-poly(styrene) block copolymers (S-B-S) are widely used in these adhesive compositions. Both classes of block copolymers give the adhesive compositions specific properties related to the respective inherent characteristics of these block copolymers. For example, the softness of S-I-S makes this polymer the material of choice for pressure sensitive applications in tapes and labels. Alternatively, the elevated cohesion of S-B-S makes this material attractive for construction adhesives for disposable soft goods.

When compounded into hot melt adhesives, S-I-S polymers degrade by a chain scission mechanism; molecular weight is reduced and the cohesive strength of the adhesive is lowered. S-B-S polymers, on the other hand, tend to degrade by further chemical cross-linking increasing the cohesive strength of the adhesive, but also increasing the elastic modulus, forming a too hard and non-tacky adhesive. The thermal decomposition of both S-I-S and S-B-S based adhesives can ruin the utility of the adhesive product. It would be an advantage to the hot melt adhesive industry if polymers with less tendency to either fall apart (scission) or cross-link would be developed. In EP-669350 and U.S. Pat. No. 5,583,182, adhesive compositions have been described wherein the styrenic block copolymer is a block copolymer of an S-B-I-S type, an $(S-B-I)_n$-X type or an $(S-I-B)_n$-X type, wherein S represents a polystyrene block, B represents a polybutadiene block and I represents an isoprene block. These copolymers with block copolymer midblocks "B-I" combine some of the characteristics of S-I-S and S-B-S type polymers. However, the process to make blocks of polydienes in the midblock is demanding, more complex and requires long polymerization times. It has also been demonstrated that because of the blocky structure in the midblock, their heat stability performance is still inadequate and that the hot-melt viscosity of formulated adhesives is too elevated for industrial applications compared to respectively S-I-S or S-B-S based formulations.

In WO 00/14170 an adhesive composition is described based on an elastomeric component comprising (I) an SIS block copolymer and (II) an SBS block copolymer, and on a tackifying component comprising (III) a first hydrocarbon resin compatible with said SIS block copolymer and (IV) a second hydrocarbon resin compatible with said SBS block copolymer. However, the necessity to use two block copolymers (SIS and SBS) as well as two hydrocarbon resins is not a cost effective approach for the manufacture of adhesive compositions, as it requires the adhesive manufacturers to invest deeply in expensive feeding and dosing systems on their extruders.

In DE-2942128 an adhesive composition is described based on 100 part of a non hydrogenated block copolymer A-B-A where A is polystyrene and B a block made of a mixture of Butadiene and Isoprene; from 25 to 300 part of a tackifying resin; from 5 to 200 part of a plasticizer, and some additional additives. Actually, the tackifying resin is a mixture of resins, as is illustrated in the example (50 parts of a glycerine rosin ester ("FLORAL" 85, a trademark) and 50 parts of a synthetic polyterpene resin ("WINGTACK" 95, a trademark)). This mixture appears to be required to be reasonably compatible with the base adhesive polymer.

From WO 02/057386A2 adhesive compositions are known, comprising:

i. one or more styrenic block copolymers of the general formula A-C-A (1) or $(A-C)_nX$ (2), wherein each A independently is a polymer block of an aromatic vinyl compound, a C is a mixed polymer block (B/I) of butadiene (B) and isoprene (I) in a weight ratio B:I in the range of from 30:70 to 70:30, and said polymer block C has a glass transition temperature (Tg) of at most −50 C (determined according to ASTM E 1356-98) wherein n is an integer equal to or greater than 2 and X is the residue of a coupling agent, ii. a tackifying resin, having an aromaticity (in relative percentage of aromatic protons as determined by H-NMR) in the range of from 3 to 18% and preferably from 4 to 14%, iii. one or more plasticizers.

It will be appreciated that the aromatic modified tackifying resin was taught to be selected from a very specific group in combination with said block copolymers.

Mixtures of S-B-S and S-I-S type block copolymers as suggested in the art do not provide an acceptable alternative either.

Therefore, there is still a need for an adhesive composition in which (1) the adhesive properties are at least equal to those based on S-I-S block copolymers; (2) that shows an improved heat stability in comparison to a composition derived from S-I-S and/or S-B-S block copolymers; and (3) which can be formulated using a single hydrocarbon resin tackifier resin that is readily available and inexpensive.

SUMMARY OF THE INVENTION

More cost effective adhesive compositions having good adhesive properties can be achieved by combining an S-I-S or (SI)$_n$X block copolymers with an S-(I/B) diblock copolymer and a single tackifying resin. Furthermore, less expensive adhesive compositions can be achieved by combining S-I or S-B diblock copolymers with S-(I/B)-S or [S(I/B)]nX block copolymers and a single tackifying resin. These combinations result in lower costs of starting materials and manufacturing due to simpler processing.

Accordingly, in one embodiment of the present invention an adhesive composition is provided that comprises:

i. at least one block copolymer (i)(a) of the formula A-I-A (1) or (A-I)$_n$X (2) and a diblock copolymer (i)(b) of the formula A-(I/B) (3), wherein each A independently is a polymer block of an aromatic vinyl compound, I is a poly(isoprene) polymer block, (I/B) is a mixed random polymer block of isoprene and butadiene in a weight ratio I:B of from about 20:80 to about 80:20, n is equal to or greater than 2 and X is the residue of a coupling agent, and wherein the weight ratio between (i)(a) and (i)(b) is such that the overall butadiene content in component (i) is less than 12 wt %;
ii. a tackifying resin; and
iii. optionally one or more plasticizers.

In a further embodiment of the present invention, an adhesive composition is provided that comprises:

i. a diblock copolymer (i)(a) of the formula A-I (4) or A-B (5) and at least one block copolymer (i)(b) of the formula A-(I/B)-A (6) or [A(I/B)]$_n$X (7), wherein each A independently is a polymer block of an aromatic vinyl compound, I is a poly(isoprene) polymer block, B is a poly(butadiene) block, (I/B) is a mixed random polymer block of isoprene and butadiene in a weight ratio I:B of from about 20:80 to about 80:20, n is equal to or greater than 2 and X is the residue of a coupling agent, and wherein the weight ratio between (i)(a) and (i)(b) is such that the overall butadiene content in component (i) is less than 12 wt %;
ii. a C5 tackifying resin; and
iii. optionally one or more plasticizers.

DETAILED DESCRIPTION OF THE INVENTION

Component (i)

In one embodiment of the present invention, component (i) comprises: at least one block copolymer (i)(a) having the formula:

A-I-A  (1)

or (A-I)$_n$X  (2);

wherein each A independently is a polymer block of an aromatic vinyl compound and each I is a poly(isoprene) polymer block, and a diblock copolymer (i)(b) having the formula:

A-(I/B)  (3)

wherein A is a polymer block of an aromatic vinyl compound and (I/B) is a mixed random polymer block of isoprene and butadiene in a weight ratio I:B of from about 20:80 to about 80:20.

In an alternative embodiment of the present invention component (i) comprises a diblock (i)(a) having the formula:

A-I  (4)

or

A-B  (5)

wherein A is a polymer block of an aromatic vinyl compound, I is a poly(isoprene) polymer block, B is a poly(butadiene) polymer block, and at least one block copolymer (i)(b) of the formula:

A-(I/B)-A  (6)

or

[A(I/B)]nX  (7), wherein each A independently is a polymer block of an aromatic vinyl compound, and (I/B) is a mixed random polymer block of isoprene and butadiene in a weight ratio I:B of from about 20:80 to about 80:20.

Each n in the above formulas is independently equal to or greater than 2, preferably from 3 to 5, even more preferably from 3 to 4. Each X is the residue of a coupling agent to be specified hereinafter.

Component (i)(a) can be selected from a great variety of block copolymers wherein the vinyl aromatic blocks are derived from styrene, alpha-methylstyrene, p-methylstyrene, o-methylstyrene, p-tert-butylstyrene, 2,4-dimethylstyrene, diphenylethylenes including stilbene, vinyl naphthalene, vinyltoluene (a mixture of meta- and para-isomers of methylstyrene), vinylxylene and mixtures thereof. Of these monomers, pure styrene or mixtures in which styrene is the main compound and minor amounts of one or more of the other hereinbefore mentioned comonomers are preferred. As used herein, the phrase "minor amounts" refers to amounts in the range of up to about 5 wt %, when present typically present in an amount from about 1 to about 5 wt %. While the present invention is limited to those vinyl aromatic blocks which contain a "minor amount" of one or more comonomers, those of ordinary skill in the art will recognize that in certain instances, it may be desirable to use mixtures in which the "minor amounts" are greater than 5 wt %.

Each of the A blocks in formula (1), (2), (4) or (5) of component (i)(a) is independently a polymer block of an aromatic vinyl compound as defined hereinbefore, each I is a poly(isoprene) polymer block and each B is a poly(butadiene) polymer block.

In Formula (1), (2), (4) or (5) of component (i)(a), the A blocks represent a vinyl aromatic content which is a weight ratio of the vinyl aromatic block to conjugated diene block of total block copolymer, in the range of from about 15 to about 45 wt %, preferably from about 15 to about 35 wt %, with the most preferred range being from about 15 to about 25 wt %.

The diblock and block copolymers to be used as component (i)(a) each preferably contain 1,2-vinyl bonds and/or 3,4-vinyl bonds in a proportion of at most 15 wt %, based on the weight of the conjugated diene. While the present invention is limited to diblock and block copolymers that contain 1,2-vinyl bonds and/or 3,4-bonds in proportion of at most 15 wt %, those of ordinary skill in the art will recognize that 1,2-vinyl bonds and/or 3,4-vinyl bonds in a proportion of greater than 15 wt % are possible.

Preferably said A blocks in component (i)(a) each have a weight average molecular weight in the range of from about 2,500 to about 25,000, preferably from about 7,000 to about 25,000. More preferred block copolymers of Formula (1) or (2) to be applied as component (i)(a) show a weight average molecular weight (Mw) ranging from about 100,000 to about 500,000, more preferably from about 150,000 to about 250,000 as determined by High Performance Size Exclusion Chromatography (HPSEC) according to the method described in ASTM D-5296-97, said method incorporated herein by reference. Commercially available block copolymers which can be used as component (i)(a) of the present invention include, but are not limited to, KRATON® D-1126, and KRATON® D-1161, available from KRATON Polymers LLC, QUINTAC® 3620 and QUINTAC® 3450/3451, available from Zeon Chemicals and VECTOR® 4111, available from Dexco Polymers. The preferred commercially available selections are the block copolymers KRATON® D-1126 and KRATON® D-1161. Preferred diblock copolymers of Formula (4) to be applied as component (i)(a) show a weight average molecular weight (Mw) ranging from about 5,000 to about 500,000, more preferably from about 15,000 to about 250,000, as determined by High Performance Size Exclusion Chromatography (HPSEC) according to the method described in ASTM D-5296-97.

The block copolymer component (i)(b) can have the same or different A blocks as specified hereinbefore with regard to component (i)(a). However, Formula (6) and (7) of the block copolymer component (i)(b) each have (I/B) central blocks and Formula (3) has an (I/B) endblock wherein the weight ratio of isoprene to butadiene is in the range of from about 20:80 to about 80:20, preferably from about 30:70 to about 70:30, more preferably from about 40:60 to about 60:40, and still more preferably from about 45:55 to about 55:45, and wherein the isoprene/butadiene mixtures have randomly copolymerized, i.e. without any substantial homopolymer blocks, lengths pB and pI of more than 100 monomer units, and preferably not more than 20 monomer units. The mixed central polymer block (I/B) can optionally contain up to about 5 wt % of another copolymerizable comonomer such as styrene (based on the weight of the total block) but preferably said central block will be composed of mixtures of substantially pure isoprene and substantially pure butadiene.

Preferably said A blocks in component (i)(b) also have a weight average molecular weight in the range of from about 2,500 to about 25,000, preferably from about 7,000 to about 25,000. The block copolymers of Formula (5) and (6) of component (i)(b) preferably each have a weight average molecular weight (Mw, expressed in terms of poly(styrene)) ranging from about 100,000 to about 500,000, preferably from about 150,000 to about 250,000, as determined by High Performance Size Exclusion Chromatography (HPSEC) according to the method described in ASTM D-5296-97. More preferred diblock copolymers of Formula (3) to be applied as component (i)(a) show a weight average molecular weight (Mw) ranging from about 5,000 to about 500,000, more preferably from about 15,000 to about 250,000, as determined by High Performance Size Exclusion Chromatography (HPSEC) according to the method described in ASTM D-5296-97.

The block copolymers to be used as component (i)(b) each preferably contain 1,2-vinyl bonds and/or 3,4-vinyl bonds in a proportion of at most 15 wt %, based on the weight of the conjugated diene. While the present invention is limited to diblock and block copolymers that contain 1,2-vinyl bonds and/or 3,4-vinyl bonds in proportion of at most 15 wt %, those of ordinary skill in the art will recognize that 1,2-vinyl bonds and/or 3,4-vinyl bonds in a proportion of greater than 15 wt % are possible.

In Formula (3), (6), or (7) of component (i)(b), the A blocks represent a vinyl aromatic content which is a weight ratio of the vinyl aromatic block to conjugated diene block of the total block copolymer, in the range of from about 15 to about 45 wt %, preferably from about 15 to about 35 wt %, with the most preferred range being from about 15 to about 25 wt %.

Polymers having mixed midblocks (as in the case of Formulas (6) and (7)) or a mixed endblock (as in the case of Formula 3) derived from isoprene and butadiene, are defined as having average homopolymer block lengths of less than 100 monomer units, preferably less than 50 monomer units, and more preferably less than 20 monomer units. Average homopolymer block length is determined by the method, based carbon-13 NMR, as described in detail in WO 02/057386, from page 12, line 14 to page 15, line 13, which is incorporated herein by reference.

The block copolymers of Formulas (1), (2), (6), and (7) according to the present invention can be made by e.g., coupling initially prepared living block copolymers, obtained by anionic polymerization, with a coupling agent, or by full sequential (co)polymerization of batches of vinylaromatic monomer, conjugated diene and vinyl aromatic monomer respectively. It will be appreciated that mixtures of multiblock copolymers and preferably triblock copolymers, and diblocks originating from the starting living block copolymer to be coupled or by reinitation during a full sequential polymerization process, can be obtained. The coupling agent, when used, can include, but are not limited to, tin coupling agents such as methyl tin trichloride, tin tetrachloride; halogenated silicon coupling agents such as silicon tetrachloride and silicon tetrabromide, alkoxysilanes such as tetramethoxysilane; and halogenated alkanes such as trichloroethane, trichloropropane and tribromopropane, divinyl aromatic compounds, halogenated aromatic compounds, epoxy compounds such as the diglycidyl ether of bisphenol-A and the like and other coupling agents such as benzoic esters, $CO_2$, 2-chloropropene and 1-chloro-1,3-butadiene. Silicon tetrachloride, silicon tetrabromide, tetramethoxysilane and other tetra(alkoxy)silanes are preferred.

Thus each coupled (or sequentially reinitiated) block copolymer may contain a complimentary diblock [A-I or A-(I/B)] where the ratio of block copolymer component to its complimentary diblock may range in weight ratio of from 100:0 to 30:70, preferably 90:10 to 40:60. It is also possible to blend in a diblock component prepared in a separate polymerization reaction. For example, a sequentially prepared A-I-A or A-(I/B)-A may be blended with a diblock [A-I or A-(I/B)] that was prepared in a separate polymerization reaction.

The diblock copolymers of the formulas (3), (4) and (5) of the present invention can be made by any of the processes known in the art. One such process is the sequential (co) polymerization of batches of vinylaromatic monomer and conjugated diene. When sequential polymerization is utilized, it will be recognized that while a pure diblock is desired, due to die out, small amounts of homopolystyrene may be present (usually less than about 5 wt %). It will also be appreciated that the diblock copolymers of the present invention may also be made by processes such as coupling and re-initiation, which are processes known in the art. When such processes are utilized, mixtures of multiblock copolymers (triblock copolymers as well as radial copolymers) and diblocks originating from the starting living block copolymer to be coupled or by re-initation during a full sequential polymerization process, can be obtained. The coupling agent, when used, can be any of the coupling agents mentioned hereinbefore. In certain instances, mixtures of diblock and multiblock copolymers will be desired since such mixtures might improve strength and performance factors for the overall formulations. In the present invention, it is preferred that the diblock be a pure diblock product. However, when mixtures of diblock and multiblock copolymers are utilized, the diblock to multiblock ratio should not be less than about 70:30. In the mixtures, preferably the ratio will range from about 70:30 to about 95:5 When the diblock copolymers are made by coupling, it is recognized that the degree of coupling efficiency will be very low in order to produce a product having the diblock content noted above. Accordingly, the coupling efficiency will typically range from about 5% to about 30%. In order to achieve these blends, it is also possible to blend a multiblock component prepared in a separate polymerization reaction with the diblock copolymer. For example, the diblock A-I may be blended with an amount of A-I-A prepared in a separate polymerization reaction in order to meet the ratios noted above.

With regard to all of the embodiments of the present invention, the weight ratio between said block copolymers (i)(a) and (i)(b) is such that the overall butadiene content in component (i) is less than or equal to 12 wt %. Preferably, the ratio is such that the overall butadiene content in component (i) is from greater than 0 to 12 wt %, more preferably from about 6 to about 12 wt % with the most preferred range being from about 8 to about 10 wt %.

Component (ii)

Suitable tackifying resins, which can be successfully used as the sole tackifying component in the adhesive compositions of the present invention, show a differential scanning calorimetry (DSC) glass transition temperature Tg between 30 and 60° C. and a Ring and Ball softening point between 80 and 110° C. They can be selected from modified aliphatic hydrocarbon resins such as $C_5$ hydrocarbon resins. Suitable tackifying resins include, but are not limited to C5 resins that are not aromatic modified, such as for example, A-100 from Zeon Chemical, the ESCOREZ® 1000 series, especially ESCOREZ® 1202, from ExxonMobil, and PICCOTAC® 1095 or PICCOTAC® 1098 from Eastman Chemical Company. The preferred tackifying resin to be used as the sole tackifying component (ii) is PICCOTAC® 1095, a modified aliphatic hydrocarbon resin, showing a Ring and Ball softening point of 95° C. The preferred solid tackifying resins will have a Ring and Ball softening point in the range of from 85 to 97° C.

Those of ordinary skill in the art will recognize that in some instances it might be possible to use aromatic modified resins to tackify the blends of the present invention provided that these resins are sufficiently low in aromaticity. Those of ordinary skill in the art also recognize that the more aromaticity the resin has, the greater the butadiene content may be. Accordingly, in some instances the degree of aromaticity can be substantially low enough as to allow the low aromatic resins to be used to achieve cost effective products similar to those of the present invention.

The adhesive composition according to the present invention preferably comprises from about 50 to about 300 parts by weight, preferably from about 100 to about 200 parts by weight of tackifying resin per 100 parts by weight of block copolymer component (i). In preferred adhesive compositions, the component (ii) occurs in a proportion of from about 30 to about 55 wt %, relative to the weight of the complete composition.

Component (iii)

The adhesive compositions of the present invention may contain one or more plasticizers. Suitable plasticizers include predominantly plasticizing oils that are paraffinic or naphthenic in character (carbon aromatic distribution $\leq 5\%$, preferably $\leq 2\%$, more preferably 0% as determined according to DIN 51378) and a glass transition temperature lower than −55° C. as measured by Differential Scanning Calorimetry. Products such as these are commercially available from the Royal Dutch/Shell Group of companies, and include SHELL-FLEX®, CATENEX™, EDELEX™ and ONDINA® oils. Other plasticizing oils that may be used include KAYDOL® oil from Witco, TUFFLO® oils from Arco or NYPLAST® from NYNAS. Still other plasticizers that are suitable for the present invention include compatible liquid tackifying resins such as REGALREZ® R-1018 from Hercules Inc. or WING-TACK® 10 from Goodyear Tire and Rubber Company.

Still other plasticizers may also be added, such as olefin oligomers; low molecular weight polymers ($\leq 30,000$ g/mol) such as liquid polybutene, liquid polyisoprene copolymers, liquid styrene/isoprene copolymers or liquid hydrogenated styrene/conjugated diene copolymers; vegetable oils and their derivatives; or paraffin and microcrystalline waxes.

The composition according to the present invention preferably comprises one or more plasticizers in a weight proportion of from about 5 to about 15 wt %, relative to the weight of the complete composition and of from about 10 to about 85 parts by weight of plasticizer per 100 parts by weight of block copolymer constituent (i) (components (i)(a) and (i)(b)). Also each block copolymer may be pre-blended with a small amount of plasticizer by the manufacturer of said copolymer.

Other Components (Non-Limitative)

Other rubber components may also be incorporated into the adhesive compositions according to the present invention. It is also known in the art that various other components can be added to modify the tack, the odor, and the color of the adhesives. Antioxidants and other stabilizing ingredients can also be added to protect the adhesive from degradation induced by heat, light and processing or during storage.

Several types of antioxidants can be used, either primary antioxidants such as hindered phenols or secondary antioxidants such as phosphite derivatives or blends thereof. Examples of commercially available antioxidants are IRGANOX® 565 from Ciba-Geigy (2.4-bis-(n-octylthio)-6-(4-hydroxy-3,5-di-tertiary-butyl anilino)-1,3,5-triazine), IRGANOX® 1010 from Ciba-Geigy (tetrakis-ethylene-(3,5-di-tertiary-butyl-4-hydroxy-hydrocinnamate)methane), IRGANOX® 1726 from Ciba-Geigy; IRGANOX® 1076 from Ciba-Geigy; ETHANOX® 330 from Albemare; IRGAFOS® 168 from Ciba-Geigy and POLYGARD® HR from Uniroyal (tris-(2,4-di-tertiary-butyl-phenyl)phosphite). Other antioxidants developed to protect the gelling of the polybutadiene segments can also be use, such as SUMILIZER® GS from Sumitomo (2[1-(2-hydroxy-3,5-di-ter-pentylphenyl)ethyl)]-4,6-di-tert-pentyiphenylacrylate); SUMILIZER® T-PD from Sumitomo (pentaerythrythyltetrakis(3-dodecylthiopropionate)); or mixtures thereof.

Preparation of the Composition

No particular limitation is imposed on the preparation process of the adhesive compositions of the present invention. Therefore, there may be used any process such as a mechanically mixing process making use of rolls, a Banbury mixer or a Dalton kneader, a hot-melt process characterized in that heating and mixing are conducted by using a melting kettle equipped with a stirrer, like a high shear Z-blade mixer or a single- or twin-screw extruder, or a solvent process in which the compounding components are poured in a suitable solvent and stirred, thereby obtaining an intimate solution of the pressure sensitive adhesive composition.

Use of the Compositions

PSA compositions according to the present invention may be applied without using any solvent (e.g., hot-melt) or in the form of their solutions to a base material such as paper or a plastic film by means of a proper coater, thereby producing various kinds of pressure sensitive adhesive tapes for tapes or labels.

During label manufacture, a laminate of a face stock, pressure sensitive adhesive layer and a release liner are passed through an apparatus which converts the laminate into commercially useful labels and label stock. The process involves, among others, die-cutting and matrix stripping to leave labels on a release liner.

It will be appreciated that another aspect of the present invention is formed by tapes, labels or bandages obtained by application of the hereinbefore specified adhesive compositions of the present invention on a carrier.

The present invention will hereinafter be illustrated more specifically by the following examples, however without restricting the scope to these specific embodiments.

Test Methods

Standard peel, tack, cohesion and viscosity tests were carried out on these formulations as described in the Test method manual for Pressure Sensitive Tapes from the Pressure Sensitive Tape Council (PSTC), the standard FINAT test method for Pressure sensitive materials, the AFERA test methods for Pressure Sensitive Adhesive Tapes and the ASTM related methods. Different testing surfaces have been used in function of the application: chromed stainless steel plates (No. 304)("ss") as recommended by the FINAT and Kraft paper.

- Rolling Ball Tack (RBT) is the distance, expressed in centimeters, a steel ball rolls on the adhesive film with a standard initial velocity (Pressure Sensitive Tape Council Method No. 6; ASTM D3121-73). Small numbers indicate aggressive tack.
- Loop Tack (LT) was determined using Pressure Sensitive Tape Council Method No. 5 and FTM 9 loop tack method. High numbers LT indicate aggressive tack.
- Peel Adhesion (PA) was determined by Pressure Sensitive Tape Council Method No. 1 and ASTM D3330-83. Large numbers indicate high strength when peeling a test tape from a steel substrate.
- Holding Power (HP) is the time required to pull a standard area (2.5'1.3 cm) of tape from a standard test surface (steel=ss) under a standard load (1 kg, 2 or 5 kg), in shear at 2° (Pressure Sensitive Tape Council Method No. 7; ASTMD-3654-82). Long times indicate high adhesive strength. Results are expressed in hours (h) or minutes (min). The type of failure mode is expressed as adhesive failure (AF) or cohesive failure (CF). This test can be carried out at room temperature (about 23° C.) or at a more elevated temperature, depending on the test.
- The SAFT (shear adhesion failure temperature) was measured by 2.5×2.5 cm Mylar to chromed ss plates with a 1 kg weight. The samples are placed in an oven and the temperature raised by 22° C./minute. SAFT measures the temperature at which the lap shear assembly fails.
- Polystyrene content was determined by 1H-NMR.
- Ring and Ball softening point is a measure of the temperature at which a resin softens following the ASTM E-28 test method.

The compounds/components used in the tested adhesive compositions have been listed in Table 1.

TABLE 1

| | |
|---|---|
| Polymer 1 | KRATON ® D 1114 - a sequential poly(styrene)-poly(isoprene)-poly(styrene) block copolymer with a 19% polystyrene content, and a total molecular weight of about 170,000,000 g/mol |
| Polymer 2 | a poly(styrene)-(polyisoprene/polybutadiene) diblock with a polystyrene content of 19%, a total weight of 90,000 g/mol having a isoprene/butadiene weight ratio of 60:40 |
| SHELLFLEX ® 371 | a naphthenic oil from available from Shell Chemicals |
| IRGANOX ® 1010 | an antioxidant available from Ciba-Geigy |
| PICCOTAC ® 1095 | a C5 aliphatic hydrocarbon resin with a softening point of 95° C., an aromaticity of 0% available from Eastman Chemical Company. |

Adhesive compositions were prepared from 100 parts by weight of the block copolymer mixture (i), 110 parts by weight of tackifying resin (ii), 15 parts by weight of plasticizers oil (iii) and 3 parts by weight of an antioxidant.

The specific ingredients for each adhesive composition and the test results are listed in Table 2.

TABLE 2

S-I-S/S-I/B Blend - function of BD content
S-I-S/S-I/B Blend
FORMULATION
100 phr Polymer
110 phr Resin
15 phr Oil
3 phr Antioxidant

| | 10% wt BD | 12% wt BD | 16% wt BD |
|---|---|---|---|
| Diblock content of polymer blend Composition, grams | 25% diblock | 30% diblock | 40% diblock |
| Polymer 1 (S-I-S) | 7.5 | 7 | 6 |
| Polymer 2 (S-I/B) | 2.5 | 3 | 4 |
| PICCOTAC ® 1095 | 11 | 11 | 11 |
| SHELLFLEX ® 371 | 1.5 | 1.5 | 1.5 |
| IRGANOX ® 1010 | 0.3 | 0.3 | 0.3 |
| Rolling Ball Tack (cm) | 7.4 | 10.7 | 21.3 |
| Polyken Probe (kg) | 0.6 | 0.5 | 0.4 |
| Loop Tack (oz/in) | 114 | 110 | 101 |
| 180 Peel (pli) | 5.8 | 5.6 | 6.1 |
| 180 Peel Failure | Ghosting | Ghosting | Ghosting |
| HP Steel (min), 2 kg | * | * | * |
| HP Kraft (min), 2 kg | 1393 | 1227 | 1534 |
| SAFT Mylar (° C.) 0.5 kg | 93 | 93 | 93 |

The data in Table 2 show that within a narrow range of total butadiene content, blends of S-I-S and S-I/B polymers can be tackified by using an inexpensive C5 resin without the necessity of an additional aromatic modified resin. Here, total polybutadiene content is defined as the polybutadiene content of the two block copolymer components (i)(a) and (i)(b).

Total polybutadiene content=(grams polybutadiene/grams polyisoprene+grams polybutadiene)*100

Note that the polybutadiene content is not calculated basis the total formulation of polymers, resin, plasticizer and stabilizers but is instead calculated based on the mixture of the polymers.

What is claimed is:

1. An adhesive composition comprising,
   i. at least one block copolymer (i)(a) of the formula A-I-A or (A-1)nX, and a diblock copolymer (i)(b) of the formula A-(I/B), wherein each A is independently a polymer block of an aromatic vinyl compound, each I is a poly(isoprene) polymer block, (I/B) is a mixed random polymer block of isoprene and butadiene in a weight ratio of I:B of from 20:80 to 80:20, n is an integer equal to or greater than 2 and X is the residue of a coupling agent, and wherein the weight ratio between said block copolymers (i)(a) and (i)(b) is such that the overall butadiene content in component (i) is from 0 to less than 12 wt %,
   ii. a tackifying resin selected from C5 hydrocarbon resins, and
   iii. one or more plasticizers.

2. The adhesive composition of claim 1, wherein the block copolymers (i)(a) and (i)(b) each have a poly(vinyl aromatic) content in the range of from 15 to 35 wt % and the I:B weight ratio in the diblock copolymer (i)(b) is in the range of from 30:70 to 70:30.

3. The adhesive composition of claim 2, wherein the block copolymers (i)(a) each have a weight average molecular weight in the range of from 100,000 to 500,000 and the diblock copolymer (i)(b) has a weight average molecular weight in the range of from about 5,000 to about 250,000.

4. The adhesive composition of claim 1, wherein the tackifying resin shows a differential scanning calorimeter (DSC) glass transition temperature between 30 and 60° C.

5. The adhesive composition of claim 1, wherein the tackifying resin shows 30 a softening point between 80 and 110° C.

6. The adhesive composition of claim 1, wherein the tackifying resin is an aliphatic hydrocarbon resin, showing a Ring and Ball softening point between 85 and 97° C.

7. The adhesive composition of claim 1, comprising from 50 to 300 parts by weight of resin per 100 parts by weight of block copolymer component (i).

8. The adhesive composition of claim 7, wherein the one or more plasticizers are present in an amount of from 10 to 85 parts by weight of plasticizer per 100 parts by weight of block copolymer component (i).

9. Tapes, labels or bandages that are obtained by applying the adhesive composition of claim 1 to a carrier.

* * * * *

UNITED STATES PATENT AND TRADEMARK OFFICE
CERTIFICATE OF CORRECTION

| | | |
|---|---|---|
| PATENT NO. | : 7,872,065 B2 | Page 1 of 1 |
| APPLICATION NO. | : 11/372157 | |
| DATED | : January 18, 2011 | |
| INVENTOR(S) | : Donn A. DuBois et al. | |

It is certified that error appears in the above-identified patent and that said Letters Patent is hereby corrected as shown below:

Col. 12, line 10 Claim 5, after "shows" delete "30".

Signed and Sealed this
Eighth Day of March, 2011

David J. Kappos
*Director of the United States Patent and Trademark Office*